(12) United States Patent
Hanada

(10) Patent No.: US 9,391,465 B2
(45) Date of Patent: Jul. 12, 2016

(54) ELECTRICAL STORAGE DEVICE MANAGEMENT SYSTEM

(75) Inventor: Masato Hanada, Tokyo (JP)

(73) Assignee: TOSHIBA MITSUBISHI-ELECTRIC INDUSTRIAL SYSTEMS CORPORATION, Tokyo (JP)

(*) Notice: Subject to any disclaimer, the term of this patent is extended or adjusted under 35 U.S.C. 154(b) by 119 days.

(21) Appl. No.: 14/342,971

(22) PCT Filed: Oct. 20, 2011

(86) PCT No.: PCT/JP2011/074177
§ 371 (c)(1),
(2), (4) Date: Mar. 5, 2014

(87) PCT Pub. No.: WO2013/057821
PCT Pub. Date: Apr. 25, 2013

(65) Prior Publication Data
US 2014/0239912 A1    Aug. 28, 2014

(51) Int. Cl.
*H02J 7/00* (2006.01)
*H02J 7/02* (2016.01)
*H02J 7/04* (2006.01)

(52) U.S. Cl.
CPC ............ *H02J 7/0026* (2013.01); *H02J 7/00* (2013.01); *H02J 7/0091* (2013.01); *H02J 7/02* (2013.01); *H02J 7/04* (2013.01)

(58) Field of Classification Search
CPC ............ H01M 10/482; H01M 2010/4271; H01M 10/4207; H01M 10/441; H01M 10/486; H01M 2/1077; H01M 10/0445; H01M 6/42; H01M 6/5011; H02J 7/0021; H02J 7/0013; H02J 7/0019; H02J 2007/0067

USPC ................... 320/116–121, 134, 136
See application file for complete search history.

(56) References Cited

U.S. PATENT DOCUMENTS 5,539,297 A * 7/1996 Fiebig .................. H02J 7/0024
320/126
2004/0104709 A1   6/2004 Yamaji et al.
(Continued)

FOREIGN PATENT DOCUMENTS

CN         101841176 A      9/2010
JP         7-130399         5/1995
(Continued)

OTHER PUBLICATIONS

International Preliminary Report on Patentability issued May 1, 2014 in PCT/JP2011/074177 filed on Oct. 20, 2011.
(Continued)

*Primary Examiner* — Nghia Doan
(74) *Attorney, Agent, or Firm* — Oblon, McClelland, Maier & Neustadt, L.L.P

(57) ABSTRACT

In an electrical storage device management system, a control part monitors the temperatures of electrical storage cells. In electrical storage systems that are in a charging/discharging operating state, if the temperature of any of the electrical storage cells has reached a first threshold temperature, the control part switches an electrical storage system that includes this electrical storage cell to a non-charging/discharging state. The control part also switches one of the electrical storage systems that is in the non-charging/discharging state, to the charging/discharging operating state.

3 Claims, 7 Drawing Sheets

(56) References Cited

U.S. PATENT DOCUMENTS

| | | | |
|---|---|---|---|
| 2010/0237832 A1 | 9/2010 | Mack | |
| 2011/0068744 A1* | 3/2011 | Zhu | H02J 7/0016 320/116 |
| 2011/0210703 A1 | 9/2011 | Souza et al. | |
| 2013/0004812 A1* | 1/2013 | Nishida | H01M 10/486 429/62 |

FOREIGN PATENT DOCUMENTS

| | | |
|---|---|---|
| JP | 8-251714 A | 9/1996 |
| JP | 9-259940 | 10/1997 |
| JP | 10-334951 | 12/1998 |
| JP | 2001-185228 A | 7/2001 |
| JP | 2001-327091 | 11/2001 |
| JP | 2003-223937 | 8/2003 |
| JP | 2003-244854 A | 8/2003 |
| JP | 2008-148419 | 6/2008 |
| JP | 2009-11138 | 1/2009 |
| JP | 2010-4627 | 1/2010 |
| JP | 2010-220280 A | 9/2010 |
| JP | 2011-177025 A | 9/2011 |
| JP | 2011-192537 A | 9/2011 |

OTHER PUBLICATIONS

Written Opinion issued Jul. 24, 2012 in PCT/JP2011/074177 filed on Oct. 20, 2011 (with English translation).

International Search Report issued Jul. 24, 2012 in PCT/JP11/74177 filed Oct. 20, 2011.

Combined Office Action and Search Report issued Aug. 5, 2015 in Chinese Patent Application No. 201180074234.5 (with Partial English translation).

Supplementary European Search Report issued May 5, 2015 in Patent Application No. 11 87 4140.

* cited by examiner

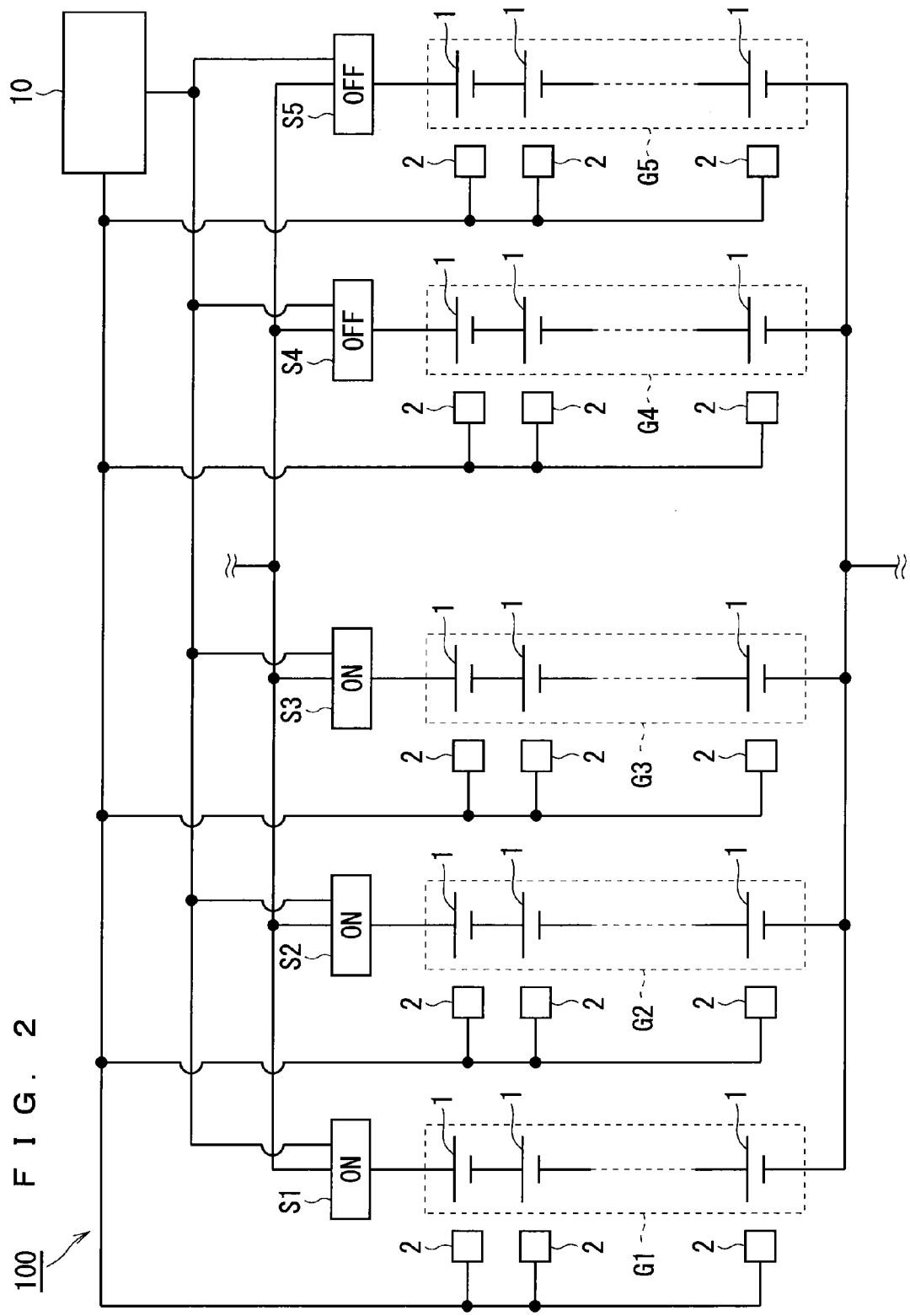

FIG. 3

| SEQUENCE | ELECTRICAL STORAGE SYSTEMS TO BE SWITCHED |
|---|---|
| 1 | G4 |
| 2 | G5 |
| 3 | FIRST ELECTRICAL STORAGE SYSTEM TO BE SWITCHED FROM CHARGING/DISCHARGING OPERATING STATE TO NON-CHARGING/DISCHARGING STATE |
| 4 | SECOND ELECTRICAL STORAGE SYSTEM TO BE SWITCHED FROM CHARGING/DISCHARGING OPERATING STATE TO NON-CHARGING/DISCHARGING STATE |
| 5 | THIRD ELECTRICAL STORAGE SYSTEM TO BE SWITCHED FROM CHARGING/DISCHARGING OPERATING STATE TO NON-CHARGING/DISCHARGING STATE |
| ... | ... |
| i | i-2TH ELECTRICAL STORAGE SYSTEM TO BE SWITCHED FROM CHARGING/DISCHARGING OPERATING STATE TO NON-CHARGING/DISCHARGING STATE |
| ... | ... |

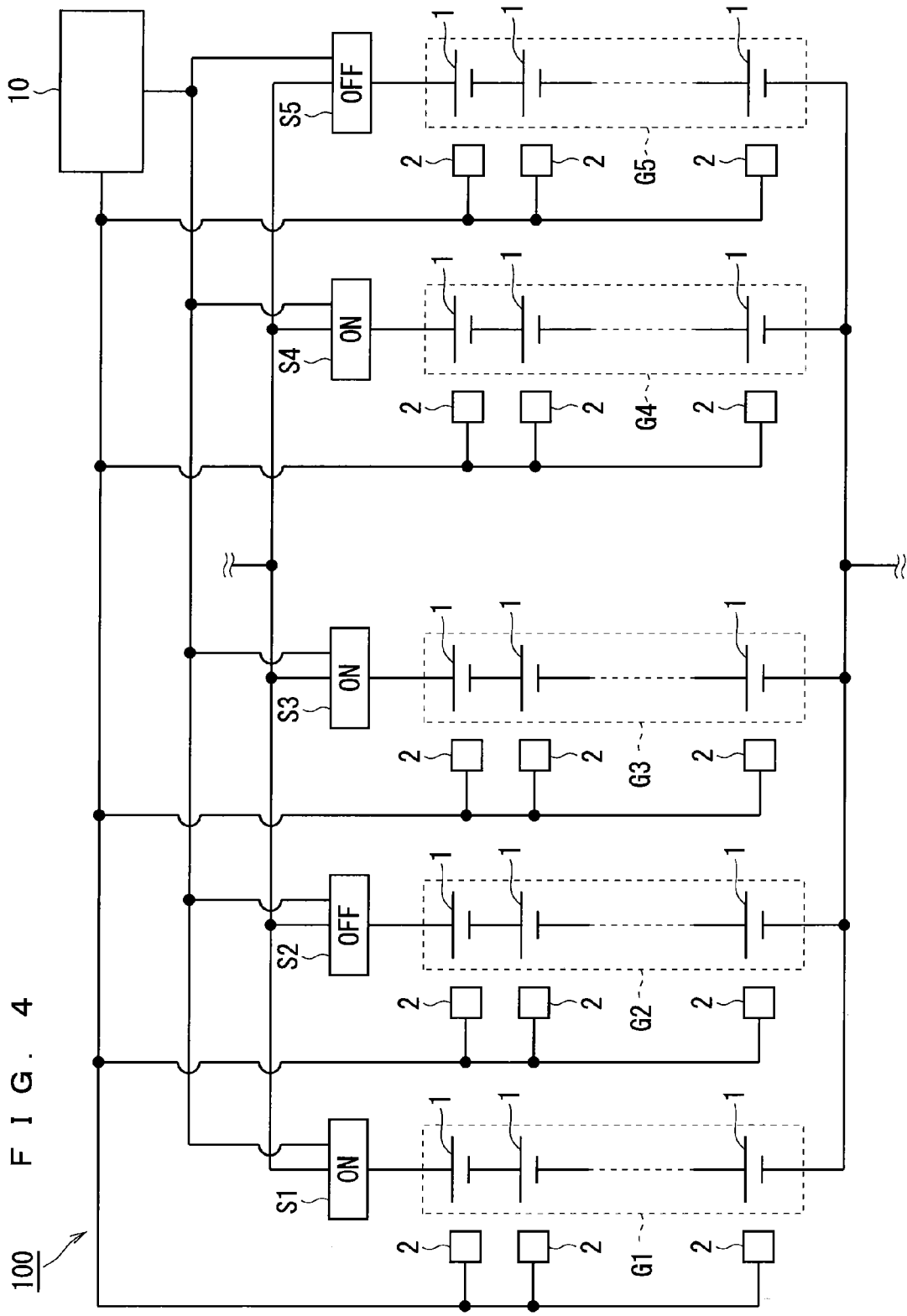

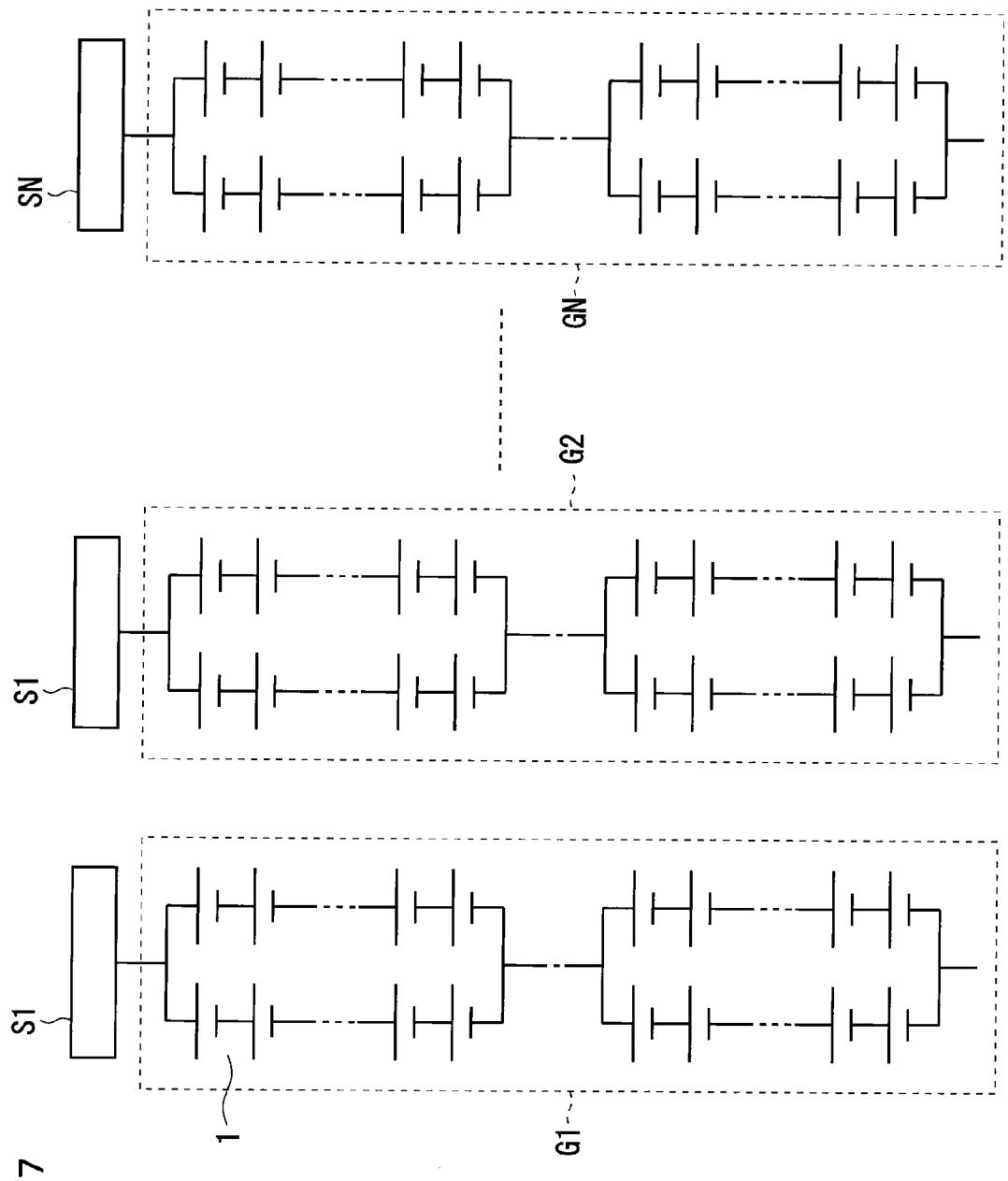
F I G. 7
ELECTRICAL STORAGE DEVICE MANAGEMENT SYSTEM

TECHNICAL FIELD

The present invention relates to an electrical storage device management system for performing control during charging/discharging operations of an electrical storage device that includes electrical storage cells such as lithium ion batteries.

BACKGROUND ART

Secondary batteries have undergone further development, and for example, lithium ion batteries have been receiving attention due to their high capacity, high energy density, and potential for size and weight reduction.

An electrical storage device used as a power source for various electronic and electric devices is generally configured by series-parallel connection of a plurality of secondary batteries. When used as a power source, the electrical storage device is connected to an electronic or electric device and discharges electricity. In the case of charging the electrical storage device, the electrical storage device is connected to a power supply system.

Patent Document 1 is an example of a prior art document relating to lithium ion batteries. Patent Document 2 is an example of a prior art document relating to electrical storage devices.

A lithium ion battery according to Patent Document 1 is capable of preventing overcharging/overdischarging and controlling battery temperature without retaining space for heat dissipation. An electrical storage device according to Patent Document 2 is capable of quick charging with high current and thereby reliably cutting the charging current off when the battery temperature becomes high.

PRIOR ART DOCUMENTS

Patent Documents

Patent Document 1: Japanese Patent Application Laid-Open No. 10-334951 (1998)
Patent Document 2: Japanese Patent Application Laid-Open No. 2008-148419

SUMMARY OF INVENTION

Problems to be Solved by the Invention

Electrical storage devices in recent years are required to obtain high input/output currents when charging/discharging. However, increasing the current value for charging/discharging causes an increase in the amount of heat generated by secondary batteries. This places a limitation on the method of using electrical storage devices, such as not being able to perform continuous (extended) charging/discharging, in order to reduce the amount of heat generated by the secondary batteries while obtaining high input/output currents when charging/discharging.

In view of this, it is an object of the present invention to provide an electrical storage device management system that allows an electrical storage device to obtain high input/output currents continuously over a long period of time when charging/discharging.

Means for Solving the Problems

In order to achieve the object described above, the electrical storage device management system according to the present invention includes a plurality of rows of electrical storage systems, a plurality of chargeable/dischargeable electrical storage cells constituting each of the electrical storage systems, a plurality of switching parts provided in correspondence with the electrical storage systems, a plurality of temperature sensors provided in correspondence with the electrical storage cells and configured to detect temperatures of the corresponding electrical storage cells, and a control part connected to the switching parts and the temperature sensors. The control part has set therein a first threshold temperature. The control part is configured to (A) monitor the temperatures of the electrical storage cells on the basis of temperature information transmitted from the temperature sensors, and when a result of the operation (A) indicates that the temperature of one of the electrical storage cells has reached the first threshold temperature in one of the electrical storage systems that is in a charging/discharging operating state, (B) perform system switching in which the switching part that is disposed in correspondence with the electrical storage system that includes the electrical storage cell is controlled, and the electrical storage system is switched from the charging/discharging operating state to a non-charging/discharging state, and (C) perform system switching in which one of the switching parts that is disposed in correspondence with one of the electrical storage systems that is in the non-charging/discharging state is controlled, and the electrical storage system is switched from the non-charging/discharging state to the charging/discharging operating state.

Effects of the Invention

The electrical storage device management system according to the present invention includes a plurality of rows of electrical storage systems, a plurality of chargeable/dischargeable electrical storage cells constituting each of the electrical storage systems, a plurality of switching parts provided in correspondence with the electrical storage systems, a plurality of temperature sensors provided in correspondence with the electrical storage cells and configured to detect temperatures of the corresponding electrical storage cells, and a control part connected to the switching parts and the temperature sensors. The control part has set therein a first threshold temperature. The control part is configured to (A) monitor the temperatures of the electrical storage cells on the basis of temperature information transmitted from the temperature sensors, and when a result of the operation (A) indicates that the temperature of one of the electrical storage cells has reached the first threshold temperature in one of the electrical storage systems that is in a charging/discharging operating state, (B) perform system switching in which the switching part that is disposed in correspondence with the electrical storage system that includes the electrical storage cell is controlled, and the electrical storage system is switched from the charging/discharging operating state to a non-charging/discharging state, and (C) perform system switching in which one of the switching parts that is disposed in correspondence with one of the electrical storage systems that is in the non-charging/discharging state is controlled, and the electrical storage system is switched from the non-charging/discharging state to the charging/discharging operating state.

Accordingly, it is possible to provide an electrical storage device management system that allows an electrical storage device to obtain high input/output currents continuously over a long period of time when charging/discharging.

These and other objects, features, aspects and advantages of the present invention will become more apparent from the

BRIEF DESCRIPTION OF DRAWINGS

FIG. 2 illustrates operations of the electrical storage device management system 100 according to Embodiment 1.

FIG. 3 illustrates a sequence, set in a control part 10, in which electrical storage systems are switched from a non-charging/discharging state to a charging/discharging operating state.

FIG. 4 illustrates operations of the electrical storage device management system 100 according to Embodiment 1.

FIG. 7 illustrates another configuration of electrical storage systems.

DESCRIPTION OF EMBODIMENT

In the present invention, an electrical storage device is configured by a plurality of rows of electrical storage systems. Each of the electrical storage systems is configured by a plurality of chargeable/dischargeable electrical storage cells. The electrical storage systems are each provided with a switching part. In the electrical storage device according to the present invention, not all of the electrical storage systems perform charging/discharging operations during charging/discharging processing, and some of the electrical storage systems are in a non-charging/discharging state in which they do not perform charging/discharging operations.

The electrical storage cells generate heat according to the current value during charging/discharging, and the electrical storage device management system according to the present invention monitors the temperatures of the respective electrical storage cells. If the temperature of one of the electrical storage cells becomes high, the electrical storage device management system controls the corresponding switching part so as to disconnect an electrical storage system that includes the high-temperature electrical storage cell (hereinafter, referred to as an electrical storage system A) from the charging/discharging processing.

The electrical storage device management system also selects an arbitrary electrical storage system from among the electrical storage systems that are in the above non-charging/discharging state and controls the switching part connected to the selected electrical storage system. Under the control of the switching part, the selected electrical storage system (referred to as an "electrical storage system B") is switched from the non-charging/discharging state to a charging/discharging operating state, and the electrical storage system B performs charging/discharging operations, instead of the electrical storage system A.

Hereinafter, an embodiment of the present invention will be described in detail with reference to the drawings.

Embodiment 1

In the present embodiment, the electrical storage cells constituting the electrical storage systems are all storage batteries such as lithium ion batteries. In the description of the present embodiment, electrical storage cells are referred as "storage batteries."

Figure 1:
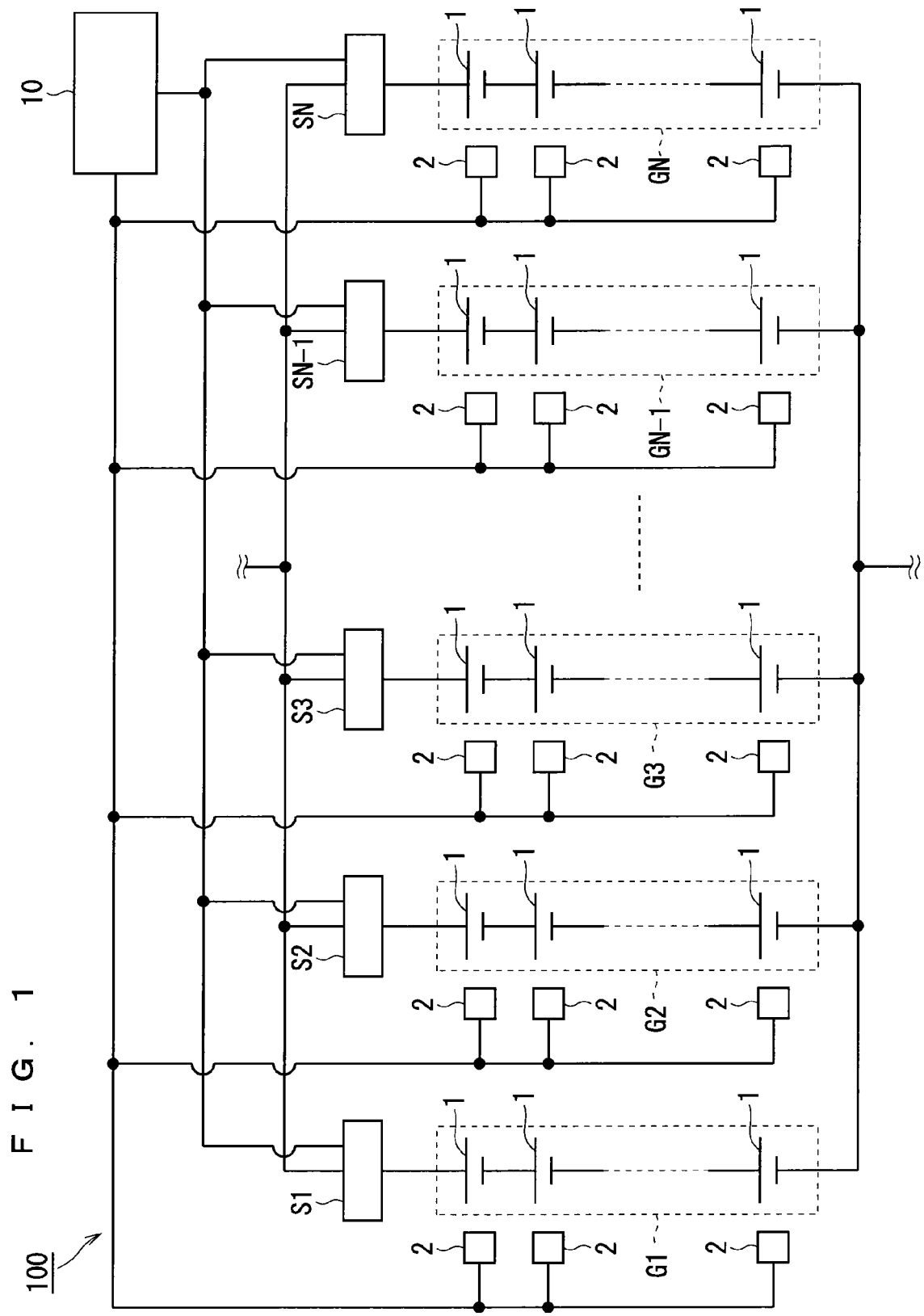
FIG. 1 is a block diagram showing a configuration of an electrical storage device management system 100 according to Embodiment 1.

FIG. 1 is a diagram illustrating a configuration of an electrical storage device management system 100 according to the present embodiment. In FIG. 1, the configuration excluding a control part 10 can be regarded as an electrical storage device. The electrical storage device management system 100 includes the electrical storage device and the control part 10, which is for monitoring and controlling the electrical storage device.

In the case of discharging, portions of the electrical storage device that are indicated by dashed lines in FIG. 1 are connected to a load such as an electronic or electric device via a converter or the like, so that the electrical storage device functions as a power source for the load. The same portions indicated by dashed lines are also used in the case of charging via a converter or the like.

As shown in FIG. 1, the electrical storage device includes a plurality of rows of electrical storage systems G1, G2, G3, . . . , GN-1, and GN. Here, as shown in FIG. 1, the electrical storage systems G1, G2, G3, . . . , GN-1, and GN are each configured by a plurality of chargeable/dischargeable storage batteries 1. The storage batteries 1 are chargeable/dischargeable secondary batteries and may be lithium ion batteries, for example.

In the exemplary configuration in FIG. 1, the electrical storage systems G1, G2, G3, . . . , GN-1, and GN are each configured by a plurality of series-connected storage batteries 1.

The electrical storage systems G1, G2, G3, . . . , GN-1, and GN are respectively provided with switching parts S1, S2, S3, . . . , SN-1, and SN as shown in FIG. 1.

Specifically, as shown in FIG. 1, the switching part S1 is connected to an electrical storage battery 1 that is located at one end of the electrical storage system G1. The switching part S2 is connected to an electrical storage battery 1 that is located at one end of the electrical storage system G2. The switching part S3 is connected to an electrical storage battery 1 that is located at one end of the electrical storage system G3. The switching part SN-1 is connected to an electrical storage battery 1 that is located at one end of the electrical storage system GN-1. The switching part SN is connected to an electrical storage battery 1 that is located at one end of the electrical storage system GN.

The current input/output ends of the switching parts S1 to SN are commonly connected to one another by wiring (see one side of the portions indicated by dashed lines).

The switching parts S1, S2, S3, . . . , SN-1, and SN are connected to the control part 10 so as to be capable of transmitting and receiving data and signals, for example. The switching parts S1, S2, S3, . . . , SN-1, and SN are turned on or off under the control of the control part 10.

When the switching parts S1, S2, S3, . . . , SN-1, and SN are in the ON state, the electrical storage systems G1, G2, G3, . . . , GN-1, and GN connected to the switching parts S1, S2, S3, . . . , SN-1, and SN are chargeable/dischargeable (i.e., they are in the charging/discharging operating state). On the other hand, when the switching parts S1, S2, S3, . . . , SN-1, and SN are in the OFF state, the electrical storage systems G1, G2, G3, . . . , GN-1, and GN connected to the switching parts S1, S2, S3, . . . , SN-1, and SN are not chargeable/dischargeable (i.e., they are in the non-charging/discharging state).

The electrical storage device management system 100 also includes a plurality of temperature sensors 2 as shown in FIG. 1. Each of the temperature sensors 2 is disposed in correspondence with and in the vicinity of one of the storage batteries 1.

The temperature sensors 2 are connected to the control part 10 so as to be capable of transmitting and receiving data and signals, for example. Each of the temperature sensors 2 detects the temperature of the corresponding electrical storage battery 1. The temperature sensors 2 then transmit detection results (temperature information) to the control part 10.

The control part 10 of the electrical storage device management system 100 is communicably connected to the switching parts S1, S2, S3, . . . , SN-1, and SN and the temperature sensors 2 as described above.

The control part 10 receives the temperature information transmitted from the temperature sensors 2. The control part 10 also has preset therein a first threshold temperature. Here, a temperature in the high temperature zone is selected as the first threshold temperature, and for example, a maximum temperature at which the storage batteries 1 are capable of normally inputting and outputting a rated current (or a temperature slightly lower than this maximum temperature) can be employed as the first threshold temperature.

The control part 10 uses the above temperature information and the above first threshold temperature to control on/off switching of the switching parts S1, S2, S3, . . . , SN-1, and SN. Note that specific operations of controlling on/off switching of the switching parts S1, S2, S3, . . . , SN-1, and SN, performed by the control part 10, will be described later. Apart from being used for temperature control, the switching parts S1, S2, S3, . . . , SN-1, and SN may also be used to disconnect a specific storage system if there are any abnormalities in individual batteries, or may be used for maintenance.

Although not shown in FIG. 1, the electrical storage device management system 100 also includes a cooler for cooling the storage batteries 1.

The cooler may be disposed for each of the storage batteries 1, a single cooler may be provided for each predetermined number of the storage batteries 1, or a single cooler may be provided for all of the storage batteries 1.

The cooler may be known cooling means and may be a fan or the like, for example. The storage batteries 1 are forcibly cooled by the cooler.

Next, the operations of the electrical storage device management system 100 according to the present embodiment will be described with reference to FIGS. 2, 4, 5, and 6.

To simplify the description, the electrical storage device shown in FIGS. 2, 4, 5, and 6 is assumed to include five rows of electrical storage systems G1, G2, G3, G4, and G5 (accordingly, the electrical storage device includes five switching parts S1, S2, S3, S4, and S5 that correspond respectively to the electrical storage systems G1, G2, G3, G4, and G5).

It is assumed that the electrical storage device is performing charging/discharging operations, and that the switching parts S1, S2, and S3 are in the ON state and the switching parts S4 and S5 are in the OFF state as shown in FIG. 2. In other words, the electrical storage systems G1, G2, and G3 are in the "charging/discharging operating state" and the electrical storage systems G4 and G5 are in the "non-charging/discharging state."

Moreover, the control part 10 has preset therein information regarding the subsequent sequence, in addition to the first threshold temperature. Specifically, the control part 10 has set therein information regarding the sequence in which the electrical storage systems G1, G2, G3, G4, and G5 are switched from the non-charging/discharging state to the charging/discharging operating state. Every time the temperature of one of the storage batteries 1 has reached the first threshold temperature, the control part 10 switches one of the electrical storage systems G1, G2, G3, G4, and G5 from the non-charging/discharging state to the charging/discharging operating state in accordance with the information regarding the sequence.

FIG. 3 illustrates an example of the information regarding the sequence, and it is assumed that the information shown in FIG. 3 is set in the control part 10.

In the example of FIG. 3, the electrical storage system G4 is the first electrical storage system to be switched from the non-charging/discharging state to the charging/discharging operating state. The electrical storage system G5 is the second electrical storage system to be switched from the non-charging/discharging state to the charging/discharging operating state. The electrical storage system that was first to be switched from the charging/discharging operating state to the non-charging/discharging state is the third electrical storage system to be switched from the non-charging/discharging state to the charging/discharging operating state. The electrical storage system that was second to be switched from the charging/discharging operating state to the non-charging/discharging state is the fourth electrical storage system to be switched from the non-charging/discharging state to the charging/discharging operating state. That is, in the example shown in FIG. 3, from the third switching onwards, the electrical storage systems G1 to G5 are switched from the non-charging/discharging state to the charging/discharging operating state in rotation, in the sequence in which electrical storage system switching was performed from the charging/discharging operating state to the non-charging/discharging state.

However, if an electrical storage system G1, G2, G3, G4, or G5 to be switched to the charging/discharging operating state includes an electrical storage battery 1 that has an abnormality or has a temperature higher than the first threshold temperature, the electrical storage system G1, G2, G3, G4, or G5 that is in this state is not switched to and the next electrical storage system G1, G2, G3, G4, or G5 is selected. If none of the electrical storage system G1, G2, G3, G4, and G5 can be switched to, a controller (not shown) gives an alarm to notify that fact to the outside.

When the electrical storage device starts charging or discharging, the control part 10 monitors the temperatures of the respective storage batteries 1 by referencing the temperature information transmitted from the temperature sensors 2.

Assume that the result of the above temperature monitoring performed in the state shown in FIG. 2 shows that the temperature of an electrical storage battery 1 in the electrical storage systems G1, G2, and G3 that are in the charging/discharging operating state has increased considerably. For example, assume that the temperature of one of the storage batteries 1 (hereinafter, referred to as an "electrical storage battery 1A") that belong to the electrical storage system G2 which is in the charging/discharging operating state has increased considerably. Assume also that the control part 10 has received temperature information from the temperature sensor 2 provided for the electrical storage battery 1A and determined that the temperature of the electrical storage battery 1A has reached the first threshold temperature.

Here, if each of the temperature sensors 2 has set therein identification information or the like, the temperature sensor 2 also transmits its identification information to the control part 10, together with the temperature information. This allows the control part 10 to determine which of the electrical storage system G1 to G5 the temperature sensor 2 that has transmitted the temperature information belongs to (or which one of the storage batteries 1 belonging to one of the electrical storage systems G1 to G5 the temperature sensor that has transmitted the temperature information belongs to).

In the above-described case, the control part 10 determines that the temperature of the electrical storage battery 1A belonging to the electrical storage system G2 is high, and controls the switching part S2 provided for the electrical storage system G2 to which the electrical storage battery 1A belongs. Specifically, the control part 10 switches the switching part S2 from the ON state to the OFF state. Under the control of the control part 10, the electrical storage system G2 is switched from the charging/discharging operating state to the non-charging/discharging state (electrical storage system switching).

In response to the electrical storage system G2 having been switched from the charging/discharging operating state to the non-charging/discharging state, the control part 10 also performs the following control. Specifically, the control part 10 controls either of the switching parts S4 and S5 provided for the electrical storage systems G4 and G5, which are in the non-charging/discharging state prior to the switching. Under this control, either of the electrical storage systems G4 and G5 is switched from the non-charging/discharging state to the charging/discharging operating state.

Specifically, the control part 10 has set therein the information regarding the sequence illustrated in FIG. 3. In accordance with FIG. 3 (see the first in the sequence in FIG. 3), the control part 10 controls the switching part S4 provided for the electrical storage system G4. Specifically, the control part 10 switches the switching part S4 from the ON state to the OFF state. Under the control of the control part 10, the electrical storage system G4 is switched from the non-charging/discharging state to the charging/discharging operating state (electrical storage system switching).

As a result of the control part 10 having detected that the temperature of the electrical storage battery 1A is high (has reached the first threshold temperature) and having performed the aforementioned electrical storage system switching, the electrical storage device management system 100 transitions from the state shown in FIG. 2 to the state shown in FIG. 4. Here, the storage batteries 1 belonging to the electrical storage system G2 are forcibly cooled by the cooler (not shown) during a period in which the electrical storage system G2 is in the non-charging/discharging state.

Assume, for example, that the result of the above temperature monitoring performed in the state illustrated in FIG. 4 shows that the temperature of one of the storage batteries 1 (hereinafter, referred to as an "electrical storage battery 1B") belonging to the electrical storage system G1, which is in the charging/discharging operating state, has increased considerably. Assume also that the control part 10 has received the temperature information from the temperature sensor 2 provided for the electrical storage battery 1B and determined that the temperature of the electrical storage battery 1B has reached the first threshold temperature.

In the above case, the control part 10 determines that the temperature of the electrical storage battery 1B belonging to the electrical storage system G1 is high and controls the switching part S1 provided for the electrical storage system G1 to which the electrical storage battery 1B belongs. Specifically, the control part 10 switches the switching part S1 from the ON state to the OFF state. Under the control of the control part 10, the electrical storage system G1 is switched from the charging/discharging operating state to the non-charging/discharging state (electrical storage system switching).

In response to the electrical storage system G1 having been switched from the charging/discharging operating state to the non-charging/discharging state, the control part 10 also performs the following control. Specifically, the control part 10 controls either of the switching parts S2 and S5 provided for the electrical storage systems G2 and G5, which are in the non-charging/discharging state before the switching. Under this control, either of the electrical storage systems G2 and G5 is switched from the non-charging/discharging state to the charging/discharging operating state (electrical storage system switching).

To be more specific, the control part 10 has set therein the information regarding the sequence illustrated in FIG. 3. In accordance with FIG. 3 (see the second in the sequence in FIG. 3), the control part 10 controls the switching part S5 provided for the electrical storage system G5. Specifically, the control part 10 switches the switching part S5 from the OFF state to the ON state. Under the control of the control part 10, the electrical storage system G5 is switched from the non-charging/discharging state to the charging/discharging operating state.

Figure 5:
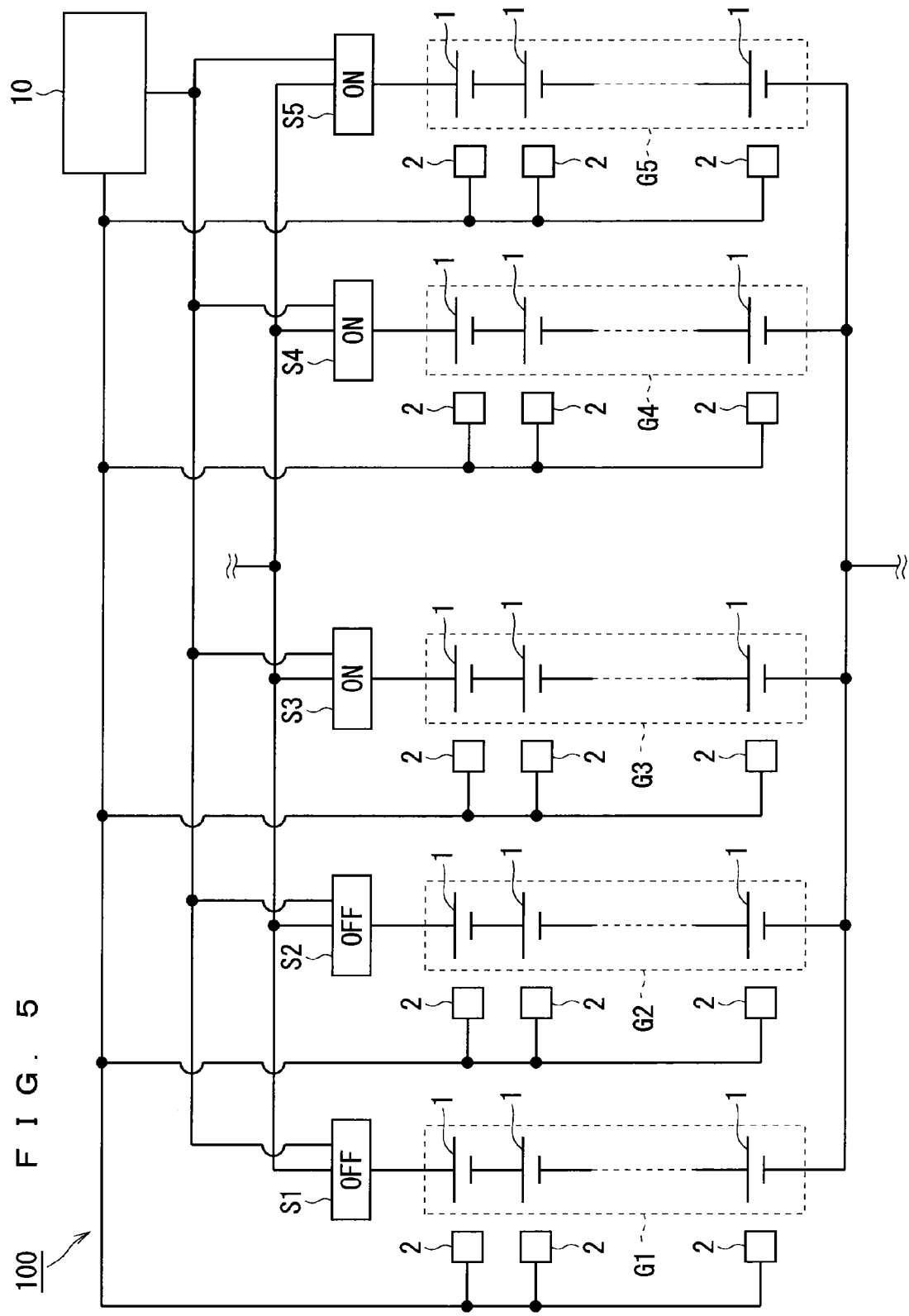
FIG. 5 illustrates operations of the electrical storage device management system 100 according to Embodiment 1.

As a result of the control part 10 having detected, in the state illustrated in FIG. 4, that the temperature of the electrical storage battery 1B is high (has reached the first threshold temperature) and having performed the above electrical storage system switching, the electrical storage device management system 100 transitions from the state shown in FIG. 4 to the state shown in FIG. 5. Here, the storage batteries 1 belonging to the electrical storage system G1 are forcibly cooled by the cooler (not shown) during the period in which the electrical storage system G1 is in the non-charging/discharging state.

As a result of the above temperature monitoring performed in the state shown in FIG. 5, it is assumed that the temperature of one of the storage batteries 1 (hereinafter, referred to as an "electrical storage battery 1C") belonging to the electrical storage system G3, which is in the charging/discharging operating state, has increased considerably. It is also assumed that the control part 10 has received the temperature information from the temperature sensor 2 provided for the electrical storage battery 1C and determined that the temperature of the electrical storage battery 1C has reached the first threshold temperature.

In the above case, the control part 10 determines that the temperature of the electrical storage battery 1C belonging to the electrical storage system G3 is high and controls the switching part S3 provided for the electrical storage system G3 to which the electrical storage battery 1C belongs. Specifically, the control part 10 switches the switching part S3 from the ON state to the OFF state. Under the control of the control part 10, the electrical storage system G3 is switched from the charging/discharging operating state to the non-charging/discharging state (electrical storage system switching).

In response to the electrical storage system G3 having been switched from the charging/discharging operating state to the non-charging/discharging state, the control part 10 also performs the following control. Specifically, the control part 10 controls either of the switching parts S1 and S2 provided for the electrical storage systems G1 and G2, which are in the non-charging/discharging state prior to the switching. Under this control, either of the electrical storage systems G1 and G2 is switched from the non-charging/discharging state to the charging/discharging operating state.

To be more specific, the control part 10 has set therein the information regarding the sequence illustrated in FIG. 3. In accordance with FIG. 3 (see the third in the sequence in FIG. 3), the control part 10 controls the switching part S5 provided for the electrical storage system G2 (as described above, the electrical storage system G2 was the first to be switched from the charging/discharging operating state to the non-charging/ discharging state). Specifically, the control part 10 switches the switching part S2 from the OFF state to the ON state. Under the control of the control part 10, the electrical storage system G2 is switched from the non-charging/discharging state to the charging/discharging operating state (electrical storage system switching). In other words, the electrical storage system G2 resumes charging/discharging operations.

Here, as described above, the storage batteries 1 belonging to the electrical storage system G2 are forcibly cooled by the cooler (not shown) during the period in which the electrical storage system G2 is in the non-charging/discharging state. Accordingly, the storage batteries 1 belonging to the electrical storage system G2, including the above electrical storage battery 1A, will resume charging/discharging operations in a low temperature state.

Figure 6:
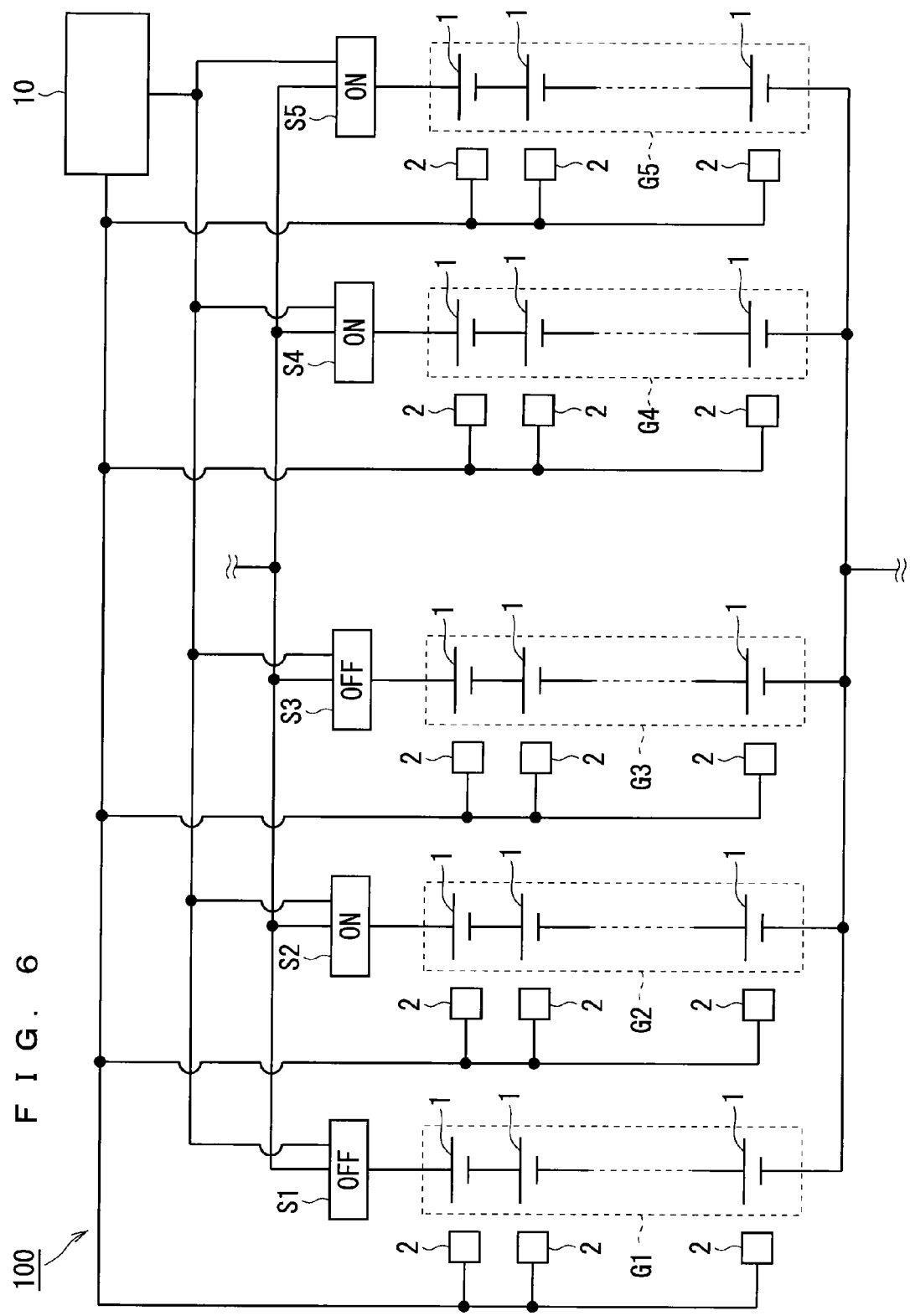
FIG. 6 illustrates operations of the electrical storage device management system 100 according to Embodiment 1.

As a result of the control part 10 having detected, in the state shown in FIG. 5, that the temperature of the electrical storage battery 1C is high (has reached the first threshold temperature) and having performed the above electrical storage system switching, the electrical storage device management system 100 transitions from the state shown in FIG. 5 to the state shown in FIG. 6.

Thereafter, in the same manner as described above, every time one of the storage batteries 1 has reached the first threshold temperature, the electrical storage system G1 to G5 to which that electrical storage battery 1 belongs is switched from the charging/discharging operating state to the non-charging/discharging state, and in accordance with the sequence illustrated in FIG. 3, one of the electrical storage systems G1 to G5 that is in the non-charging/discharging state is switched from the non-charging/discharging state to the charging/discharging operating state. The storage batteries 1 belonging to the electrical storage systems G1 to G5 that are in the non-charging/discharging state are then forcibly cooled by the cooler (not shown).

As described above, in the electrical storage device management system 100 according to the present embodiment, the control part 10 monitors the temperatures of the respective storage batteries 1 on the basis of the temperature information transmitted from the temperature sensors 2. When the result of the monitoring shows that the temperature of one of the storage batteries 1 has reached the first threshold temperature in one of the electrical storage systems G1 to G5 that is in the charging/discharging operating state, the control part 10 performs system switching in which a corresponding one of the switching parts S1 to S5 that is provided for the one of the electrical storage systems G1 to G5 including that the electrical storage battery 1 is controlled, and the one of the electrical storage systems G1 to G5 is switched from the charging/discharging operating state to the non-charging/discharging state. The control part 10 also performs system switching in which one of the switching parts S1 to G5 that is provided for one of the electrical storage systems G1 to G5 that is in the non-charging/discharging state is controlled, and the one of the electrical storage systems G1 to G5 is switched from the non-charging/discharging state to the charging/discharging operating state.

Accordingly, it is possible to provide an electrical storage device management system 100 that allows an electrical storage device to obtain high input/output currents continuously over a long period of time when charging/discharging.

In other words, when the temperature of one of the storage batteries 1 becomes high, a corresponding one of the electrical storage systems G1 to G5 to which this electrical storage battery 1 belongs is switched to the non-charging/discharging state. During the period of the non-charging/discharging state, the one of the electrical storage systems G1 to G5 performs neither charging nor discharging, and the input/output of current is also stopped. It is thus possible to cool the storage batteries 1 belonging to the corresponding one of the electrical storage systems G1 to G5. Even if one of the electrical storage systems G1 to G5 is switched to the non-charging/discharging state, one of the other electrical storage systems G1 to G5 that are in the non-charging/discharging state is instead switched to the charging/discharging operating state. Accordingly, even if one of the electrical storage systems G1 to G5 transitions to the non-charging/discharging state, the electrical storage device can continue charging/discharging with high input/output currents.

In addition, every time one of the storage batteries 1 has reached the first threshold temperature, the operation of switching the electrical storage systems G1 to G5 is performed in rotation as described above. Accordingly, even if the electrical storage device continues to obtain high input/output currents when charging/discharging, an excessive increase in the temperatures of the storage batteries 1 can be prevented. As described above, the heat generated by the current flow during charging/discharging will not cause an excessive increase in the temperatures of the storage batteries 1. Thus, the electrical storage device management system 100 allows the electrical storage device to obtain high input/output currents continuously over a longer period of time when charging/discharging.

Moreover, the electrical storage device management system 100 according to the present embodiment includes a cooler. Thus, the storage batteries 1 can be forcibly cooled during the period of the non-charging/discharging state. It is thus possible to cool the storage batteries 1 to a sufficiently low temperature condition in a short time.

In Embodiment 1, the electrical storage systems G1 to G5 are each configured by series-connected storage batteries 1. Alternatively, each of the electrical storage systems G1 to GN may be configured by series-parallel connection of storage batteries 1 as shown in FIG. 7.

In the case where the electrical storage systems are each configured by series-parallel connection of storage batteries 1, the number of parallel rows, the number of series-connected storage batteries 1 in a single parallel connection, and the number of series-connected parallel connections are arbitrarily selected in accordance with the environment in which the electrical storage device is used.

While the invention has been shown and described in detail, the foregoing description is in all aspects illustrative and not restrictive. It is therefore understood that numerous modifications and variations can be devised without departing from the scope of the invention.

DESCRIPTION OF REFERENCE NUMERALS

1 Electrical storage battery
2 Temperature sensor
10 Controller
G1, G2, G3, G4, G5, GN-1, GN Electrical storage system
S1, S2, S3, S4, S5, SN-1, SN Switching part
100 Electrical storage device management system

The invention claimed is:
1. An electrical storage device management system, comprising:
a plurality of rows of electrical storage systems;
a plurality of chargeable/dischargeable electrical storage cells constituting each of said electrical storage systems;
a plurality of switching parts provided in correspondence with said electrical storage systems;

a plurality of temperature sensors provided in correspondence with said electrical storage cells and configured to detect temperatures of said corresponding electrical storage cells; and a control part connected to said switching parts and said temperature sensors, wherein out of said plurality of rows of electrical storage systems, a first number being more than or equal to two of said electrical storage systems is set to a charging/discharging operating state, and a second number being more than or equal to two of said electrical storage systems is set to a non-charging/non-discharging state, said control part has set therein a first threshold temperature, said control part is configured to:

(A) monitor the temperatures of said electrical storage cells on the basis of temperature information transmitted from said temperature sensors; and when a result of said (A) indicates that the temperature of one of said electrical storage cells has reached said first threshold temperature in one of said electrical storage systems that is in a charging/discharging operating state, (B) perform first system switching in which said switching part that is disposed in correspondence with said electrical storage system that includes said electrical storage cell is controlled, and said electrical storage system is switched from the charging/discharging operating state to the non-charging/non-discharging state, and (C) perform second system switching in which one of said switching parts that is disposed in correspondence with one of said electrical storage systems that is in the non-charging/non-discharging state is controlled, and said electrical storage system is switched from the non-charging/non-discharging state to the charging/discharging operating state, said control part has set an operating state switching sequence in which said second number of electrical storage systems are to be switched from the non-charging/non-discharging state to the charging/discharging operating state during said second system switching, every time the temperature of one of said electrical storage cells reaches said first threshold temperature, said control part performs said first system switching and performs said second system switching in accordance with said operating state switching sequence, and the storage system that was switched in said first system switching is newly incorporated into said operating state switching sequence in the order of said first system switching.

2. The electrical storage device management system according to claim 1, wherein
said electrical storage cells are batteries.

3. The electrical storage device management system according to claim 1, further comprising:
a cooler configured to cool said electrical storage cells.

* * * * *